United States Patent
Tupper et al.

(10) Patent No.: US 7,071,657 B2
(45) Date of Patent: Jul. 4, 2006

(54) METHOD AND APPARATUS FOR THE PRODUCTION OF POWER FREQUENCY ALTERNATING CURRENT DIRECTLY FROM THE OUTPUT OF A SINGLE-POLE TYPE GENERATOR

(75) Inventors: Christopher N. Tupper, Harpswell, ME (US); Duncan G. Wood, Harpswell, ME (US)

(73) Assignee: Raven Technology, LLC, Brunswick, ME (US)

( * ) Notice: Subject to any disclaimer, the term of this patent is extended or adjusted under 35 U.S.C. 154(b) by 96 days.

(21) Appl. No.: 10/793,493

(22) Filed: Mar. 4, 2004

(65) Prior Publication Data

US 2005/0194941 A1    Sep. 8, 2005

(51) Int. Cl.
*H02K 9/14* (2006.01)
*H02K 17/00* (2006.01)
*H02K 27/04* (2006.01)
*H02H 7/06* (2006.01)
*H02P 9/10* (2006.01)

(52) U.S. Cl. .............................. 322/29; 322/6; 322/78; 310/166; 310/174; 310/171

(58) Field of Classification Search .................... 322/6, 322/78, 29; 310/166, 174, 171, 170, 168, 310/185; 323/293, 282, 362
See application file for complete search history.

(56) References Cited

U.S. PATENT DOCUMENTS

| | | | | |
|---|---|---|---|---|
| 738,756 A | * | 9/1903 | Baum | 322/20 |
| 738,757 A | * | 9/1903 | Baum | 322/20 |
| 875,179 A | * | 12/1907 | Jackson | 318/766 |
| 2,306,360 A | * | 12/1942 | Stuart, Jr. | 324/163 |
| 3,179,873 A | * | 4/1965 | Rosa | 322/2 A |
| 3,916,284 A | | 10/1975 | Hilgendorf | |
| 4,246,507 A | | 1/1981 | Weldon | |
| 4,780,659 A | * | 10/1988 | Bansal et al. | 322/58 |
| 5,696,419 A | * | 12/1997 | Rakestraw et al. | 310/268 |
| 5,739,612 A | * | 4/1998 | Davenport | 310/113 |

(Continued)

OTHER PUBLICATIONS

Tewari, Paramahamsa, website www.tewari.org, copy of portion of website describing test results of Space Power Generator.

(Continued)

*Primary Examiner*—Julio C. Gonzalez R.
(74) *Attorney, Agent, or Firm*—Verrill Dana, LLP; Chris A. Caseiro

(57) ABSTRACT

A single-pole type generator with low loss magnetic core is excited by a field coil that is part of a low loss series resonant circuit tuned to a desired AC power frequency, which may be frequencies such as 50 Hz or 60 Hz or 400 Hz. The series resonant circuit is excited at the resonant frequency. The resulting resonant behavior of the excitation circuit automatically provides the high driving voltages and sinusoidal energy storage patterns needed to efficiently modulate the magnetic field at the desired power frequency. This modulation of the excitation field is amplified by mechanical power from a rotating shaft and modulates the output current and voltage of a single phase output circuit of the single-pole type generator at that power frequency in a sinusoidal pattern thus delivering alternating current power without any requirement for further electronic rectification, commutation or processing. Design considerations critical to the implementation of a practical single-pole type generator suitable for this application are disclosed.

18 Claims, 5 Drawing Sheets

U.S. PATENT DOCUMENTS

| | | | |
|---|---|---|---|
| 5,929,610 A * | 7/1999 | Friedlander et al. | 322/37 |
| 6,051,959 A * | 4/2000 | Tupper | 322/78 |
| 6,072,303 A * | 6/2000 | Nickoladze et al. | 322/20 |
| 6,570,370 B1 | 5/2003 | Tupper | |
| 6,903,477 B1 * | 6/2005 | Kusase et al. | 310/180 |
| 2001/0002777 A1 * | 6/2001 | Ravinovici et al. | 310/166 |

OTHER PUBLICATIONS

Tewari, Paramahamsa, Genesis of Free Power Generation, Chpater 7 of The Physics of Free Power Generation, Explore vol. 6, No. 3, 1995.

* cited by examiner

METHOD AND APPARATUS FOR THE PRODUCTION OF POWER FREQUENCY ALTERNATING CURRENT DIRECTLY FROM THE OUTPUT OF A SINGLE-POLE TYPE GENERATOR

STATEMENT REGARDING FEDERALLY SPONSORED RESEARCH OR DEVELOPMENT

The invention described and claimed in this application was made with Government support under Contract DASG60-00-C-0013 awarded by U.S. Army Space and Missile Defense Command. The Government has certain rights in the invention.

BACKGROUND OF THE INVENTION

1. Field of the Invention

This invention relates generally to the production of power frequency (such as 50 Hz, 60 Hz or 400 Hz) AC power directly from single-pole type generators without the use of rectifiers, inverters, or other secondary processing of the output current and, more particularly, to an efficient method of modulating the generator output into a power frequency sinusoid via field modulation using resonant circuit techniques.

2. Description of the Prior Art

The production of power frequency (50 Hz or 60 Hz) AC power using high frequency alternators allows the engine speed to be independent of the output frequency, which allows the engine to operate at its most efficient or convenient speed, and due to the high frequency, allows small units to generate high output power. Typical systems to accomplish this include the use of inverters to shape the rectified (DC) output of the high frequency alternator, or the use of power frequency conversion switching electronics to shape the high frequency output power without explicit rectification. Because these system require hard switching and manipulation of the full output current, they involve large amperage semiconductors and the associated costs, inefficiencies and heat dissipation requirements.

Hilgendorf, in U.S. Pat. No. 3,916,284, discloses a method for producing low frequency (power frequency) AC directly from a poly-phase high frequency alternator through manipulation of the field excitation. In this method the field is modulated at the desired AC power frequency and the modulated, rectified, high frequency output is commutated, with respect to the load, via soft switching at the zero crossing points of the AC power frequency output. This method eliminates the cost and losses involved with inverter or power frequency conversion manipulation of the full output current, while retaining the light weight and speed independence of high frequency alternators. Tests on the method proposed by Hilgendorf show that it suffers several major problems: the typical cores of high frequency alternators proposed by Hilgendorf consume inordinate amounts of power through eddy currents and core losses; the high inductance typical of alternator cores require high driving voltages in order to quickly charge and discharge the magnetic energy in the field; and, as proposed by Hilgendorf, the energy exciting the field in each cycle is dissipated and wasted and must be replaced in the following cycle. Furthermore, the method of Hilgendorf does not account for the effect of residual magnetism in the alternator core, so the actual output voltage never does reduce to zero.

Tupper, in U.S. Pat. No. 6,051,959, issued Apr. 18, 2000, and entitled "Apparatus for resonant excitation of high frequency alternator field," discloses an efficient method using resonant circuit techniques to modulate the field of a high frequency poly-phase alternator built with a low loss magnetic core. This overcomes the limitations of the Hilgendorf method and produces a sinusoidal output. High efficiency generator systems on this system have been built, demonstrated and commercialized to provide high quality 60 Hz alternating current power incidental to the operation of variable speed prime movers used in motor vehicles.

The natural rectification methods inherent in the proposals of Tupper and Hilgendorf avoid the drawbacks of hard switching but still require the use of semiconductors, often diodes or SCRs, with attendant voltage-drops which translate into power losses of several percent of the output power. These losses show up as heat, which must be dissipated. The rectification process also leaves a small rectification ripple, which may be removed by filtering but which represents a nuisance complication. Furthermore, the rectification steps necessitate a subsequent commutation step to reverse the output polarity every other half cycle. This commutation requires further complications of the output electronics. (Commutation is used here in the sense of a switch or apparatus to reverse the direction of electrical current within a circuit and the commutation process typically involves complications from the inductance effects of both the generator armature and the load circuit.) Additionally, the rectification of the polyphases of the high frequency alternator, inherent in the methods of Tupper and Hilgendorf, requires high speed switching between the multiple phases. The natural inductance of each phase of the alternator output resists high frequency switching of current between these phases, and, at higher frequencies (above a so called "pole" frequency established by the values of the phase inductance and the load resistance), this effect lowers or attenuates the output voltage in proportion to the increases in alternator frequency or shaft speed. To overcome such attenuation in output voltage, additional excitation is needed in the field magnetic circuit. The saturation limits of practical magnetic materials impose a limit on how much output inductance can be overcome by additional excitation.

Furthermore, the rectification electronics inherent in the poly-phase high frequency alternators provide an impediment to the return flow of current back into the alternator. Such return-current flow would normally occur during a portion of each cycle when driving loads with power-factors different from 1.0 (i.e. when driving complex or reactive loads). Complicating adjustments to the operations of the rectifier system are often required to accommodate reactive loads.

Inherent in the present techniques is the use of high frequency alternators, which use high rotational speed and multiple magnetic poles to produce high rates of flux change, primarily from the rapid switching of magnetic fields from "north" to "south". These techniques also use multiple output phases, often three phases connected in a "wye" or "delta" arrangement. The outputs of these high frequency phases are combined by various means to produce the desired lower power frequency voltages and currents. It will be appreciated that in the present techniques, the "high frequency" signals are rectified into a quasi-constant unipolar output, much like "DC" but at a level that is modulated at the power frequency so that the level varies relatively slowly over time when compared to the high frequency alternating signals. There is a limit on how quickly the power frequency can be modulated without interfering with the high frequency alternator operation. In present practice the typical frequencies are 400 Hz or greater for the high frequency alternations of the multiple phases, and 50 or 60 Hz for the power frequency modulations or the rectified output. Some electronics for avionics applications use 400 Hz power frequency equipment. It would be quite problematic to use the referenced modulation technologies to generate 400 Hz AC power with a variable-speed, high-frequency, poly-phase generator.

Typically, motors and generators can be described by the number of magnetic poles involved in providing relative motion between the magnetic field and the armature conductors. There is no known single-pole magnet, every magnet having an inherent "north" and "south" end. However, for the purposes of this disclosure, a generator can be described as a single-pole type generator if the electric generation is due to the relative motion between armature conductors and a generally steady level of magnetic flux from a single pole (or more correctly a single pole-pair), i.e., where the flux intensity-level, polarity and direction does not vary due to relative motion. An early example of such a generator is the well-known Faraday disk, sometimes called a uni-polar or homo-polar generator. These devices are, typically, associated with DC electrical production of low voltage and high current, or with pulses of high amperage and low voltage. The inductance of any magnetizing coils in such a machine is quite high and it is difficult to quickly change the level of magnetic excitation. This works out advantageously in many of these devices as the excitation is generally held steady in order to produce a "uniform" magnetic field for producing DC output. Permanent magnets are often associated with this technology In addition to the disk type homopolar generators, like that of Faraday, there exist drum or cylindrical type homopolar generators; one example of a device designed for short pulses of uni-polar current, and for which the design details and rationale are well illustrated, is given by Weldon, et. al. In U.S. Pat. No. 4,246,507, "Removable brush mechanism for a homopolar generator," issued Jan 20, 1981.

Tupper, as cited above, also discloses the need to minimize eddy current losses in the magnetic core of generators used with resonant excitation. Ohst, in United States Statutory Invention Registration H838 "Variable resistivity slip ring," issued Nov. 6, 1990 discloses the need to minimize eddy current losses in the slip rings and armature circuitry of homopolar generators used with pulsed (time varying) excitation currents.

As a point of clarification, a single-pole type of alternator might have several different stages in each of which the flux of a single-pole operates locally on armature conductors and such stages may be combined in series or parallel combinations without changing the single-pole type of operation.

OBJECTS OF THE INVENTION

It is an object of the present invention to produce a device for producing power frequency AC voltage and current output from mechanical shaft rotation, relatively independent of shaft speed, through modulated excitation of a low loss magnetic field structure and without rectification, commutation or other electronic manipulation of the output current and without the losses inherent in the attendant semiconductor output electronics. It is a further object of the present invention to use resonant circuit techniques to provide the sinusoidal wave shaping, and to modulate the output through both positive and negative polarities. It is a further object of this invention to use the resonant circuit technique to provide the high driving voltages required by the large inductance of the field structure, and to provide for the recapture, storage and reuse of a large percentage of the field excitation energy in each cycle.

It is a further object of this invention to provide a generator which will avoid rectification ripple or attendant filtering. It is also an object of the present invention to provide a generator which will minimize the inductive attenuation of output voltage caused by high frequency switching of output current among multiple output phases. It is also an object of the present invention to devise a machine which could use these techniques to provide Alternating Current output up to a power frequency of about 400 Hz or higher, relatively independent of shaft speed.

It is a further object of this invention to provide a generator without any rectification or electronics in the output phase so that reactive currents can flow in an unimpeded manner back into the generator as needed, simplifying the handling of complex and reactive loads.

Finally, it is an object of this present invention to provide a shaft-driven, single-pole type generator that can produce a single phase of power frequency alternating current and voltage output relatively independent of shaft speed.

SUMMARY OF THE INVENTION

The objects set forth above as well as further and other objects and advantages of the present invention are achieved by the embodiments of the invention described hereinbelow. The present invention includes a shaft-driven, single-phase, single-pole type generator with a low loss magnetic core structure wherein the magnetic paths are made entirely from laminated magnetic material, or from ferro-composites, either arrangement designed to minimize eddy current losses. The magnetic field of said alternator is excited by electrical current in a field coil winding, which is arranged as part of a low-loss series resonant circuit including the inductance of the field coil, and a capacitive element, and which is designed to minimize the losses from the attendant parasitic resistances, which includes the field coil copper resistance and the resistance equivalent of the magnetic core losses, etc. The resonant field circuit is tuned by selection of its reactive components to resonate in a sinusoidal pattern at the desired AC power frequency. The circuit may be further actively tuned by application of a control system such as that proposed by Tupper et. al., in U.S. Pat. No. 6,570,370 "Apparatus for automatic tuning and control of series resonant circuits." The entire content of that patent is incorporated herein by reference.

The rotation of the shaft causes relative motion between the excitation (magnetic) field and electrical conductors in the single output phase of the single-pole type generator. The relative motion of the excitation field and the output phase of the generator is sufficiently rapid that, at any instant, the field excitation, although being induced at power frequencies by alternating current in the resonant field circuit, may be considered quasi-static, and, at any instant, the relative motion causes a uni-polar voltage in the output phase. The instantaneous voltage in each length of conductor will be the vector product cross of the relative velocity vector (cross) the (local) magnetic field intensity vector, integrated over the length of the conductor. Multiple lengths of such conductors may be added in series to produce a net voltage for the single phase. The single-phase output voltage is modulated by the resonating field. The modulated output follows the intensity and polarity of the excitation field, resulting in a sinusoidal output voltage at the AC power frequency. The output is connected to an external load to do useful work. A low voltage DC control system monitors the output voltage and controls a driver circuit that excites the field at the resonant frequency. The control system can be arranged, if desired, so that the modulated output may be synchronized with the phase and amplitude of an external AC reference. The control system may also be arranged to be able to connect the AC output of the invention to an AC grid when the output is within specified tolerances of the phase and amplitude of the reference signal.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENT

Figure 1:
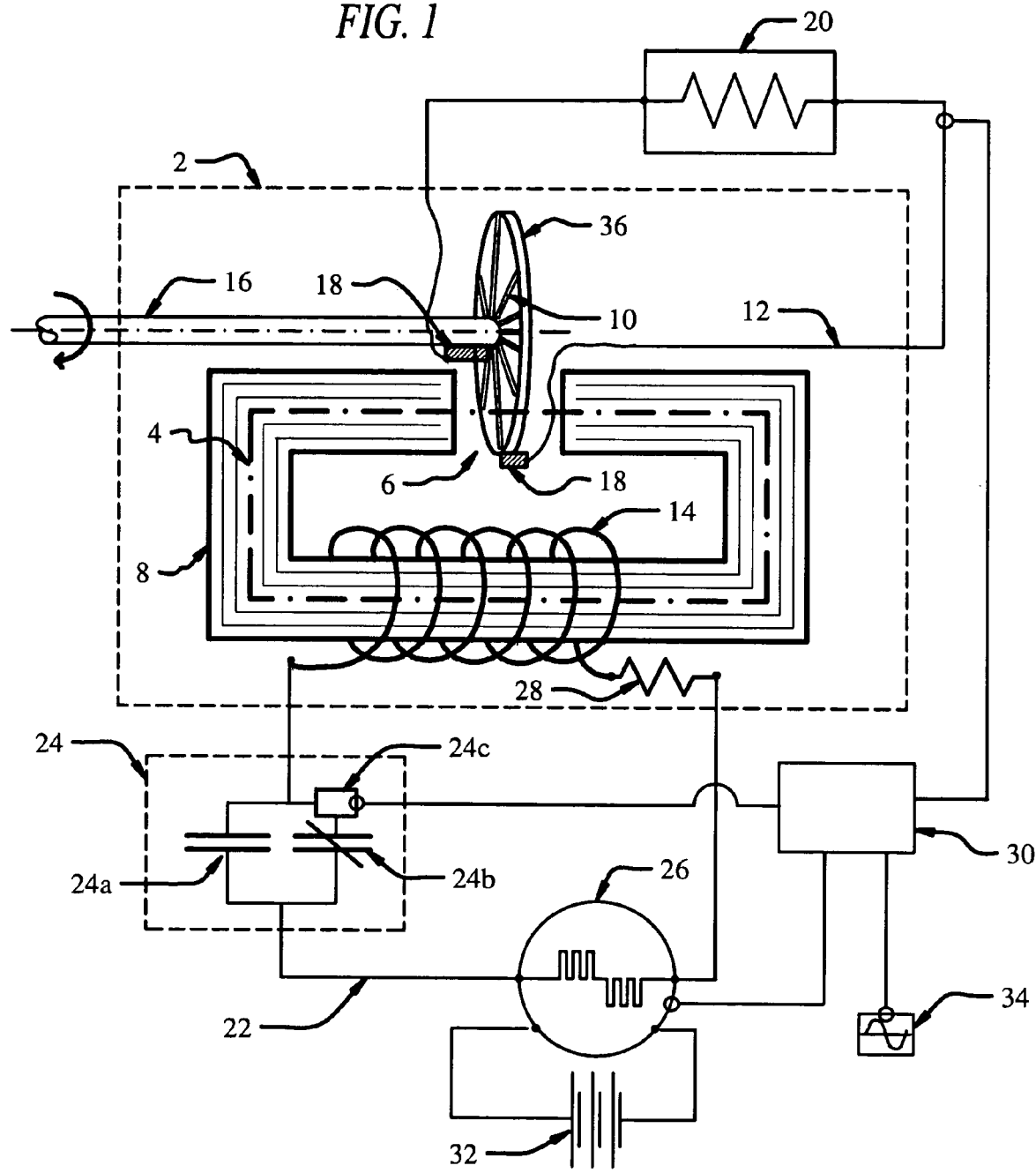
FIG. 1 is a simplified diagram of the single-pole type generator system of the present invention, including a low loss generator, and showing an excitation system and control circuitry, an external load and external reference signal.

Referring to FIG. 1, a single-pole type generator stage 2 of the present invention includes a magnetic pathway 4 at least part of which is an air-gap section 6 and the balance of which includes a low loss magnetic core 8 of high magnetic permeability. The generator stage 2 also includes a number of conductors 10 arranged as single phase output 12, and at least part of which are located within the air-gap section 6 of the magnetic pathway 4. The generator stage 2 also includes the windings of a separate, single-phase field coil 14. Electrical current within the field coil 14 controls the level of magnetic field within the magnetic pathway 4 and thus within the air-gap 6 and thus in the vicinity of the conductors 10 of the output 12. The generator stage 2 also includes a shaft 16, arranged so that rotary mechanical power applied to the shaft will cause steady relative motion between the conductors 10 and the magnetic field in the air gap 6. In this particular example, a non-conductive and non-magnetic support 36 provides means to attach the conductors 10 to the shaft 16. Although shown in the drawings as a disk, the support 36 is not limited to that construction. Relative motion between the conductors 10 and the magnetic field at the air-gap section 6 causes an output voltage in the output 12. Magnetic flux in the air-gap section 6 may be considered a "single pole" in the sense of a homo-polar generator, such as a Faraday disk, for example, although from the perspective of the low loss magnetic core 8, it is clearly due to a pole-pair.

Voltage of the output 12 is determined by the strength, direction and polarity of the magnetic field in the pathway 4 and air-gap section 6, coupled with the speed and direction of the relative motion, integrated over the length of the conductors 10. The conductors 10 can be connected by means 18, discussed in detail later, to the single-phase output 12 which may be connected to an external electrical load 20 in order to do useful work. Electrical current will flow through the load in response to the voltage in the output winding 12, and will flow in a manner which depends on the nature of the load 20, which may be resistive, reactive or some complex combination of these types. Thus, electrical power will be generated from rotation of the shaft 16 and the output voltage can be modulated by adjusting the strength and polarity of the magnetic field of the pathway 4 and air-gap section 6, which in turn can be controlled by adjusting the strength and polarity of current in the field coil 14, while the rotary motion of the shaft 16 can be an arbitrary speed greater than zero.

The field coil 14 is part of a series resonant circuit 22 which includes a capacitive element 24, and a driving circuit 26, which excites the circuit 22 at the resonant frequency. The driving circuit 26 is powered from a small power supply 32, which may be a battery or other source. By selection or adjustment of the component values for the field coil 14 inductance and capacitive element 24, the resonant frequency is tuned to match the desired AC power frequency, which may be 50 Hz 60 Hz, 400 Hz or other desired frequency. When excited near the resonant frequency by driving circuit 26, sinusoidal currents will flow through the series resonant circuit 22, including field coil 14. This, in turn, establishes a sinusoidal variation to the strength and polarity of the magnetic field in magnetic pathway 4 and in air-gap section 6. As stated above, the output voltage of the single-phase output 12 will follow the variation in the magnetic field, in this case producing a sinusoidal output voltage which can be provided to the load 20. Thus alternating current output at power frequency is produced without rectification, commutation or electronic processing of the output current, achieving one of the objects of this invention.

The present invention also includes a control circuit 30 which monitors the strength of the output voltage and adjusts the level at which driver circuit 26 excites the resonant circuit 22 so that the desired output voltage is achieved regardless of shaft speed or load. The control circuit 30 may be arranged to sense and synchronize to an external AC reference signal 34 (such as an existing grid), or to operate independently. Pulse width modulation works well for controlling the excitation level of such a resonant circuit 22. The control circuit 30 can incorporate an H-bridge circuit so that a low voltage uni-polar power supply 32, such as a battery, can provide bipolar excitation to the resonant circuit 22 which acts as a highly selective filter and can achieve smooth sinusoidal currents in the field coil 14. The control circuit 30 may also monitor the performance of the resonant circuit 22 and adjust its operation to tune the resonant circuit 22 to the desired power frequency (50 Hz, 60 Hz, 400 Hz, etc.) across a wide spectrum of operating conditions. FIG. 1 shows one possible embodiment where capacitive element 24 may include a parallel combination of a fixed capacitor 24a and a variable capacitor 24b. As explained in referenced U.S. Pat. No. 6,570,370, the variable capacitor function of 24b may be achieved with a second fixed capacitor coupled with active control of the duty cycle of this capacitor through circuitry 24c.

The series resonant circuit 22 also includes a resistance 28, which represents losses from the field coil 14, and an equivalent resistance due to the parasitic core losses (eddy current losses and hysteresis losses) inherent in the magnetic core 8. By careful design of the field coil 14 and the low loss magnetic core 8, the peak magnetic energy stored in the field coil 14 during each half can be several times greater than the energy dissipated in the resistance 28 during the half cycle. At resonance, the energy stored in the magnetic field of the field coil 14 is in opposite phase from the energy stored in the capacitor 24. The energy is stored alternately in capacitor 24 and then the field coil 14, shipped back and forth over the course of one resonant cycle. By limiting the resistive losses, a large portion of the field energy is recaptured, stored and reused each cycle by the natural resonant behavior of the circuit 22. Because of this, only a small amount of power is needed by the driver circuit 26 to modulate the field and output voltage of the generator stage 2. In effect, the generator stage 2 uses the rotary power from the shaft 16 to amplify the sinusoidal pattern of magnetic field variation, provided by low power input into the series resonant circuit 22, into much higher levels of alternating current, voltage and power in the single phase output 12 in the manner described above, thus achieving another objective of the invention.

Furthermore, as is well know, at resonance, the driving voltages of the capacitor element 24 and the inductance of the field coil 14 are in opposite phase and are of equal magnitude and thus, cancel each other. The driver circuit 26 need only supply voltage to overcome the impedance of the resistance 28. The capacitor 24 and field coil 14 inductance will provide the needed high resonant voltages to alternate the energy back and forth between themselves at the resonant frequency. The resonant voltage will be a multiple of the driver voltage; this multiple is known as resonant factor Q and is pi ($\pi$) times the ratio of peak energy stored in the reactive elements during each half cycle to the energy lost in the resistive elements during each half cycle. Q factors in excess of 10 are reasonable for practical machines. Thus the series resonant circuit 22 achieves the objectives of storing and reusing a large portion of the field energy, and providing the high resonant voltages needed to quickly energize and de-energize the field.

Figure 2:
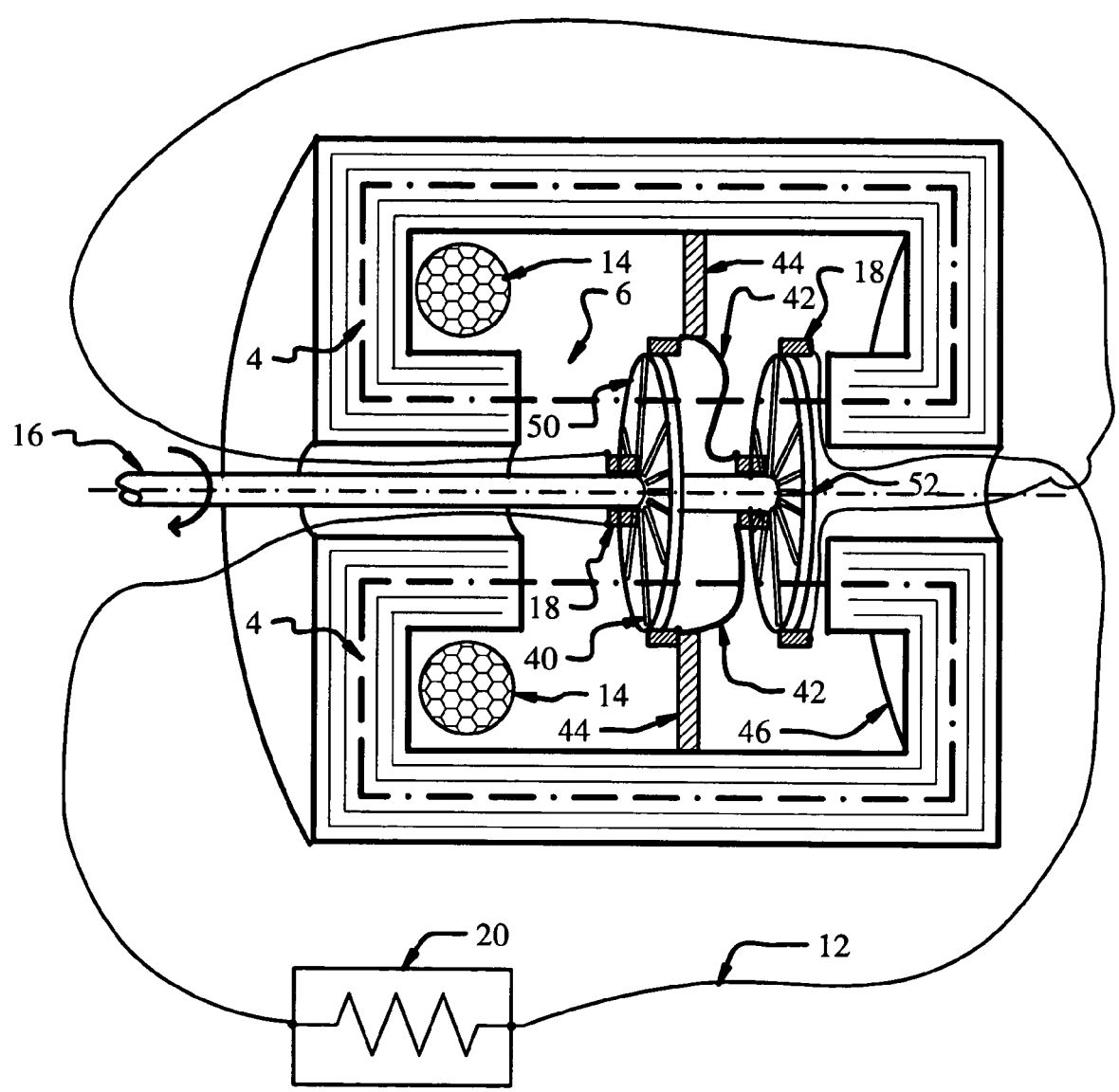
FIG. 2 is a simplified diagram of a single-pole type generator having a plurality of conductor supports on a shaft, with single phase output connected to an external load.

In order to enhance the explanation of this invention, FIG. 2 shows a schematic of the single-pole generator stage 2 of the present invention having a plurality of conductor supports on the single shaft 16. The conductor supports, represented as non-magnetic, non-conductive supports 50 and 52 similar in arrangement to support 36 of FIG. 1. The conductor arrangement in the magnetic field may be patterned after the well known Faraday disk as an example of a device suitable to be modified for use in this invention. It is to be understood that other forms of generator means may employ the magnetic field arrangement and circuitry described herein to produce the improved generator system of the present invention. The magnetic field is excited by electrical current in field coil 14. The shaft 16 rotates generating conductors 40 of supports 50 and 52 (which conductors, unlike the traditional Faraday disk would not be solid copper disks, but which must be modified for this invention, as will be explained) in the magnetic field and voltage is produced "radially" in the conductors 40, as is well documented in the literature. It will be noted that in FIG. 2, the flux in air-gap section 6 has radial symmetry so that, given a constant level of excitation and steady rotation of the shaft, the generating conductors 40 see single-pole electric generation which is due to the relative motion between conductors 40 and a generally steady level of magnetic flux from a single pole (or more correctly a single pole-pair), i.e., where the flux intensity level, polarity and direction does not vary due to relative motion.

In this example, brushes or similar means serve as means 18 to connect the generating conductors 40 to the external load 20. This is necessary for the case where voltage production might be DC in nature and the conductors 40 move relative to the load 20. It should be understood that connection means 18 might be other than brushes, as is possible for some homopolar designs where the conductors 40 are conductive fluids and current flow is provided by ion motion.

As noted above, devices of this sort tend to be low voltage, high current devices, therefore multiple stages may be required to develop the necessary voltage. FIG. 2 shows a schematic arrangement for a possible multi-support device. A number of generating conductors 40 are arranged in the magnetic field of the pathway 4 and air-gap section 6 so that, when the shaft 16 turns, all the conductors 40 of both supports 50 and 52 turn together and there is relative motion between the field and the generating conductors 40. In this example, individual generating conductors 40 are series-interconnected by means 42. It is important that connecting means 18 and interconnecting means 42 remain stationary relative to the magnetic field. Means 44, which might be some kind of support which does not interfere with the magnetic field, are used to prevent relative motion between the interconnection means 42 (and connecting means 18) and the magnetic field, while not interfering with relative motion between generating conductors 40 and the magnetic field. The output voltage is the sum of the induced voltage on each generating conductor 40 and each interconnection means 42 in the series. The voltage on each generating conductor 40 is proportional to the magnetic field intensity and relative speed between the conductor 40 and the magnetic field through pathway 4 and air-gap section 6. The voltage on each interconnection means 42 is proportional to the magnetic field intensity and relative speed between the interconnection means 42 and the magnetic field through pathway 4 and air gap 6. Since the interconnection means 42 are held stationary with respect to the magnetic field, there is no voltage generated in the interconnection means 42. Therefore, the output voltage is the series sum of the radial voltages in each of the generating conductors 40 in the series, which is proportional to the magnetic field intensity and the shaft rotational speed.

Figure 3:
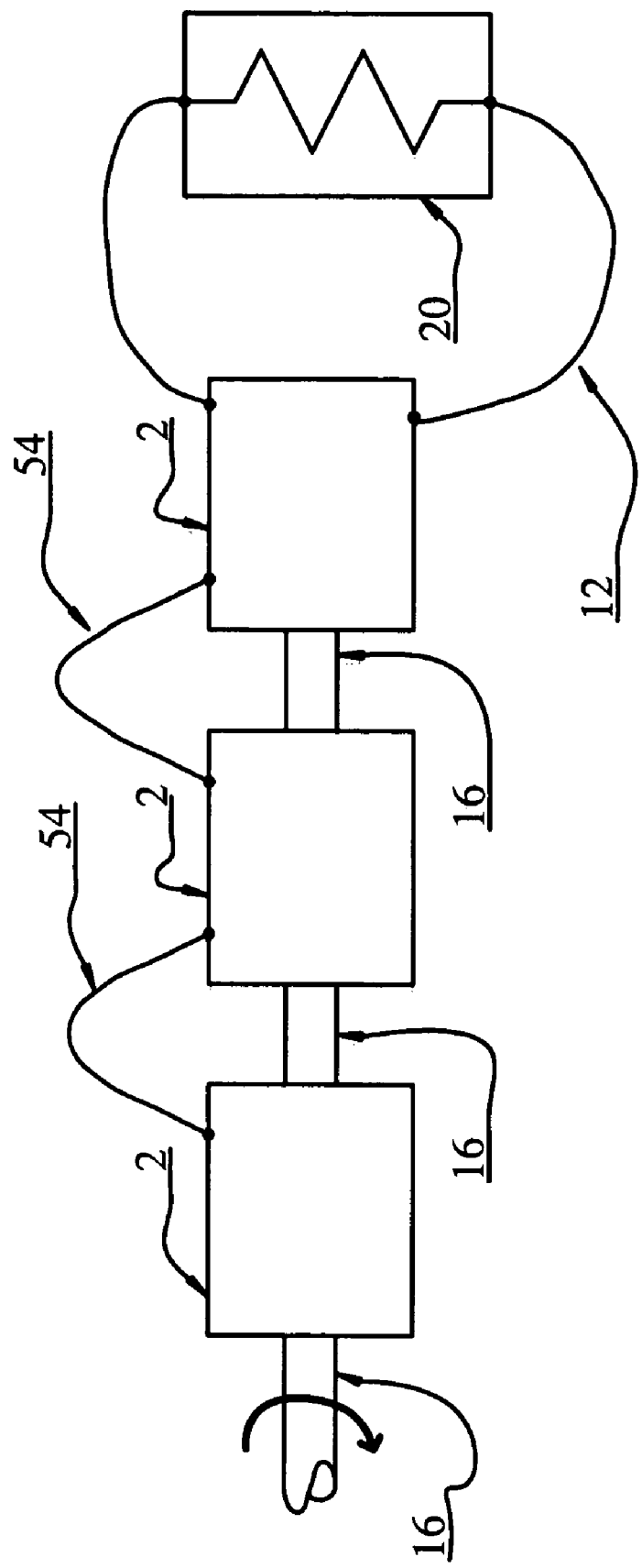
FIG. 3 is a simplified representation of the system of the present invention showing a plurality of single-pole type generator stages.

It should be noted that this invention is referred to as a single-pole type generator because the electric potential generated by each section of an output conductor is due to relative motion between that section of the conductor and a relatively steady level of magnetic flux intensity from a single magnetic pole. It will be understood that a machine could be built with a number of such "single-pole" stages combined in parallel or series as desired without changing the basic single-pole type nature and operation of the device. A simplified example of a combination of a plurality of such single-pole generator stages is shown in FIG. 3, including a plurality of stages of the type shown and described in respect of FIGS. 1 and 2. In the example of FIG. 3, electrical interconnection means 54 provides for electrical connection of each individual generator stage 2 together, whether in parallel or in series. It is to be noted that all of the plurality of generator stages 2 may be rotatably connected to the single shaft 16 or, one or more others may be connected to one or more other shafts.

Much of the instantaneous operation of this device has been described based on quasi-static excitation. It is important to realize that, while, for most machine dynamics, power frequencies of 50 Hz, 60 Hz, and 400 Hz, etc., can be thought of as nearly "static" fields, the AC modulation of the magnetic field does introduce its own issues, which influence the design of a successful generator. The need for low loss magnetic core 8 has already been mentioned to prevent eddy currents from introducing parasitic losses, which prevent resonance (and such losses also produce substantial waste heat which must be dissipated.) Laminations in the magnetic path must also be arranged such that the magnetic flux follows the plane of the laminate elements; components of time-varying magnetic flux which are perpendicular to the plane of the laminate will cause eddy current and core losses within the laminates. This will create heat to be dissipated and parasitic losses which will impede the resonant behavior of the driving circuit 26.

In addition to the use of laminated materials in the core 8, it is important to eliminate any low resistance pathways which would allow electrical currents to flow around any circuit that would enclose a significant portion of the time-varying magnetic flux in magnetic pathway 4. Potential electrical pathways are numerous in the embodiment of FIG. 2, especially along the interior surfaces of the core 8. An example of one such possible electrical pathway is shown by element 46, which, in this instance, can be understood to be an internal circumferential seam of magnetic core 8. It should be understood that any such conductive element which encircles the time-varying magnetic flux in pathway 4 is a potential pathway for eddy currents. The use of high-resistance, high-permeability ferro-composites in the magnetic core 8 is one method of addressing reducing eddy currents and losses in such pathways. Another approach is to place discontinuities or breaks in laminate assemblies to prevent the continuous conductive circuits. For example, the diametrical cut line, used for drawing purposes in FIG. 2, might be actually implemented to break the magnetic core 8 into two halves, which could then be electrically insulated from each other during assembly; such a seam would break the circumferential conductivity of the core and greatly reduce eddy current losses. Other construction methods may be used with the essential objective of breaking any continuous low-resistance pathways for eddy currents to encircle the time-varying flux of the magnetic pathway 4.

Another important factor for purposes of this invention is illustrated by the comparison with the traditional Faraday disk, which for this application would need to be further modified to minimize eddy currents in the armature conductors of such a disk. Because the magnetic field intensity is modulated at power frequencies, it is important to minimize the width of the power generating conductors 40 of the present invention, measured perpendicular to the magnetic field lines. The use of a solid copper disk as the generating conductor element (in place of individual elements 40), as is used in the traditional Faraday disk, invites large eddy current losses and heating as the field is modulated, or, indeed, as any local variations in the strength or direction of magnetic field are encountered during rotation of such a disk. Replacing a single (copper disk) conductor with multiple narrow conductors, such as conductors 10/40 greatly reduces the eddy current possibilities without compromising voltage production. Obviously, sufficient conductor cross area must be maintained so that the output current can flow without significant resistive losses. Multiple parallel strands of insulated wire can be used in some geometries for this purpose and Litz wire is specially manufactured for similar situations of changing magnetic flux.

In order to minimize the influence of eddy currents, the arrangement of generating conductors 10/40 and connecting means 18/42, such as brushes or similar means, needs to avoid the creation of a conductive path of low resistance around the circumference of the non-conducting support 36/50/52. This can be achieved by careful attention to circumferential segmentation of the generating conductors 10/40 and connection means 18/42. It will also be understood that it is important for there to be sufficient circumferential continuity, or overlap, among neighboring conductors 10/40 and connecting means 18/42 so that as individual generating conductors 10/40 connect to and disconnect from individual connecting means 18/42 due to rotation of the shaft 16, there will always be a continuous circuit in output 12, through at least some of the generating conductors 10/40.

Figure 4:
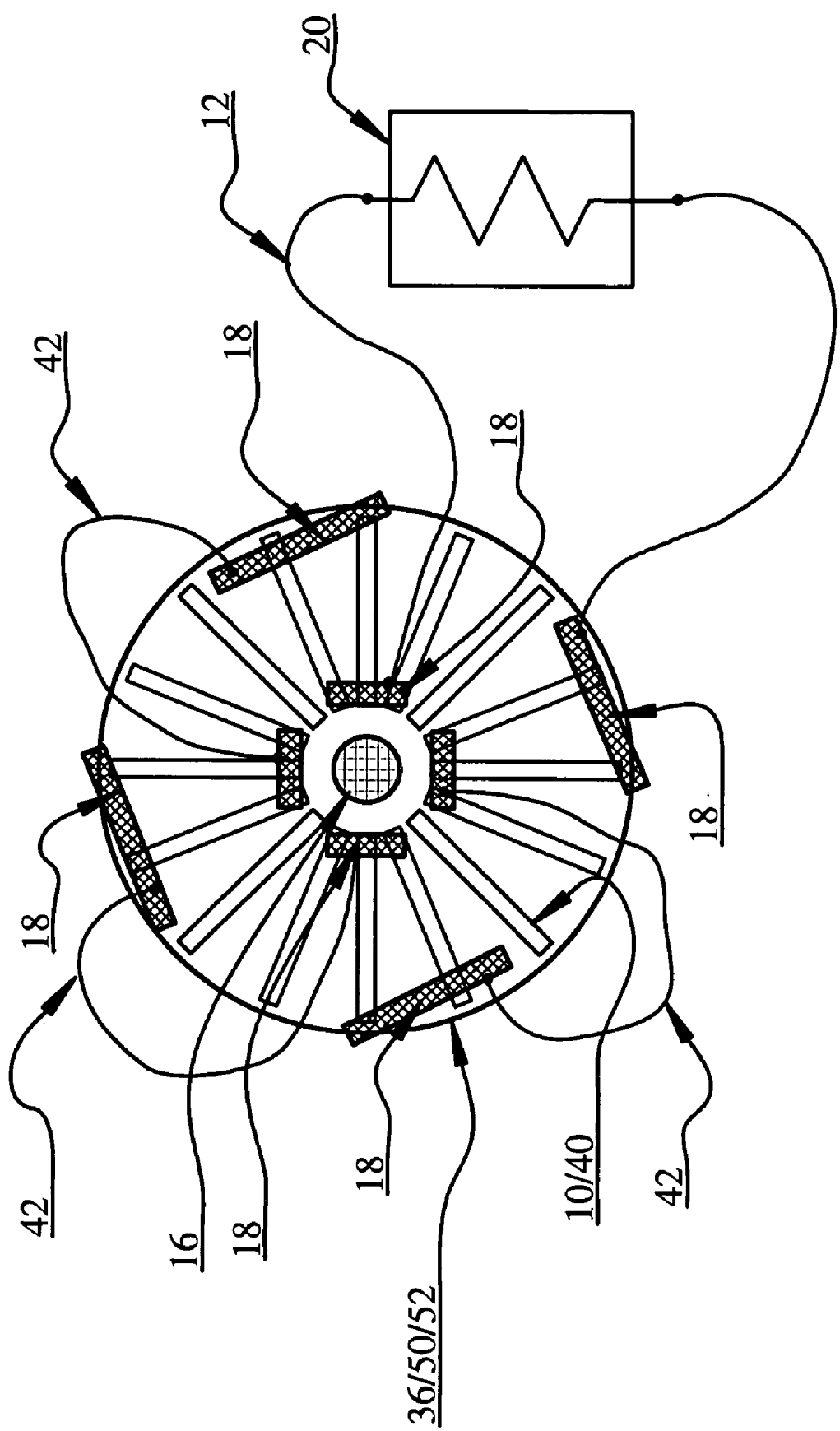
FIG. 4 is a simplified schematic of a plurality of conductors arranged radially on a single conductor support and interconnected into a series circuit to drive an external load while minimizing the effects of eddy currents.

FIG. 4 shows a schematic representation of one possible embodiment of conductors arranged radially on a single non-conductive support 36/50/52 in such a way to provide overlap between connection means 18, spaced circumferentially, and individual generating conductors 10/40, even as the generating conductors 10/40 move due to rotation of shaft 16. This arrangement provides interconnection, while minimizing eddy current losses. In this example, interconnection means 42 creates a series circuit of individual generating conductors 40 through output 12 and load 20 while preventing the creation of a low-resistance conductive path in which eddy currents could flow to enclose the magnetic flux in the air-gap section 6 (which would be understood to be perpendicular plane of the drawing) of magnetic pathway 4. The voltage in output 12 will be the series sum of the voltages induced in individual generating conductors 10/40 in the series.

It will be noted that in this arrangement individual generating conductors 10/40 are disconnected and then reconnected to the output 12 by means of connection means 18 and interconnection means 42. Because of the aforementioned overlap there is no inductive effect of the output 12 complicating the disconnect procedure as would be the case in typical commutation arrangements. In this arrangement there is only a negligible inductive effect from each individual generating conductor 10/40 as it is disconnected in this process. Thus, the usual problems of commutation are avoided, achieving an objective of this invention.

Examples based on the general configuration of the Faraday disk are used as one type of relatively clear embodiment of a single pole type motor. Using the techniques disclosed, various other single pole type configurations and their features corresponding to the supports of the present invention in particular, sometimes referred to as homo-polar, uni-polar or mono-polar generators, may be modified to achieve the objectives of this invention.

Figure 5:
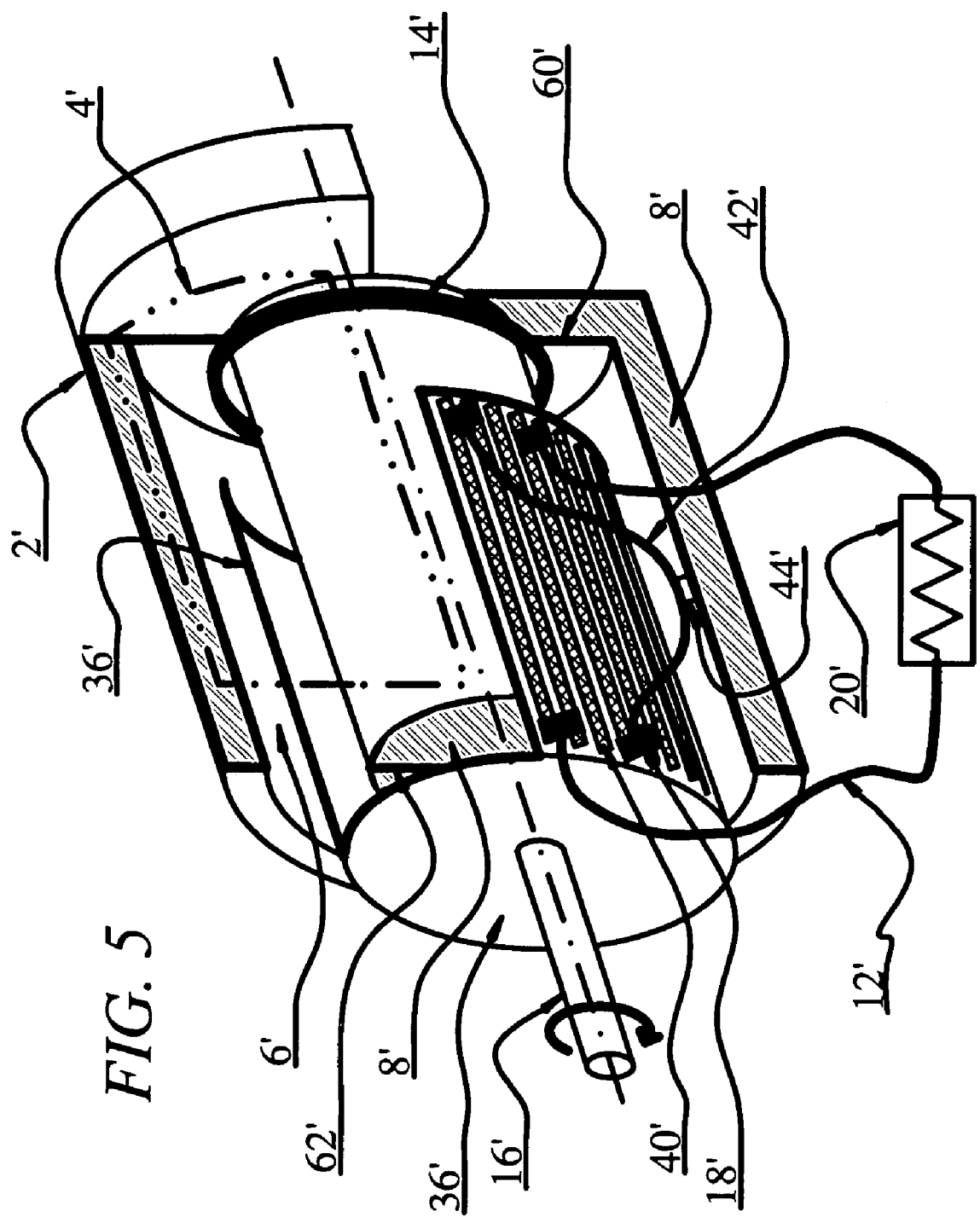
FIG. 5 is a simplified schematic of an alternate embodiment of single-pole type generator pointing out modifications of a drum type homopolar generator needed for the present invention.

FIG. 5 presents an alternate embodiment of the generation stage 2', based on a drum type arrangement of a homopolar generator and further illustrates modifications needed for the purposes of this invention. As before, the generation stage 2' has a magnetic pathway 4' which includes at least one air gap 6' and the balance of which includes a low loss magnetic core 8' of high magnetic permeability. The generator stage 2' also includes a number of generating conductors 40' arranged together with interconnection means 18', which may be brushes, and interconnection means 42', as single phase output 12, At least part of the generating conductors 40' are located within the air-gap section 6' of the magnetic pathway 4'. The generator stage 2' also includes the windings of a separate, single-phase field coil 14'. Electrical current within the field coil 14' controls the level of magnetic field within the magnetic pathway 4' and thus within the air-gap 6' and thus in the vicinity of the generating conductors 40' of the output 12'. The generator stage 2' also includes a shaft 16', arranged so that rotary mechanical power applied to the shaft will cause steady relative motion between the generating conductors 40' and the magnetic field in the air gap 6'. In this particular example, a non-conductive and non-magnetic support 36' provides means to attach the generating conductors 40' to the shaft 16'. In this embodiment the support 36' holds the generating conductors 40' along the surface of a cylindrical shape concentric with the shaft 16'. Relative motion between the generating conductors 40' and the magnetic field at the air-gap section 6' causes an output voltage in generating conductors 40', and through series interconnections by means 18' and 42' in the output 12'. It is important that connection means 18' and interconnection means 42' not move relative to the magnetic field in magnetic pathway 4' and air gap 6'. Means 44', which might be some kind of support which does not interfere with the magnetic field, are used to prevent relative motion between interconnection means 42' (and connection means 18') and the magnetic field, while not interfering with relative motion between generating conductors 40' and the magnetic field.

The magnetic core, 8' must be constructed to minimize eddy current losses and hysteresis losses due to time varying magnetic flux. The use of low-loss, high resistance, high-permeability ferro-composite materials is one method of minimizing these losses. An alternate approach is to construct the magnetic core from laminated magnetic or electrical steel, with the laminates oriented so that the flux flow path lies in the plane of each laminate; it is important to minimize ways in which the flux path can flow perpendicular to the plane of the laminates, as eddy currents can flow unimpeded within the plane of a laminate.

As explained for the first embodiment, it is important to eliminate any low resistance pathways in the magnetic core 8' which would allow eddy currents to flow and enclose the time varying flux of the magnetic pathway 4' when used with the resonant excitation circuit 24 of the present invention. This may be accomplished by the use of low-loss, high resistance, high-permeability ferro-composite materials, or by discontinuities or breaks in laminate assemblies to prevent the continuous conductive circuits, as explained above. Seams 60' and 62' in magnetic core 8' are shown in FIG. 5 to illustrate the type of electrical discontinuities required.

Also as explained for the first embodiment, it is important to minimize the influence of eddy currents in the generating conductors 40'. The use of separate generating conductors 40' with a minimum width in a direction perpendicular to the magnetic flux in air gap 6' (i.e., minimum width in the circumferential dimension) will help minimize eddy current losses. It is also important that the arrangement of generating conductors 40' and connecting means 18'/42', such as brushes or similar means, needs to avoid the creation of a conductive path of low resistance around the circumference of the non-conducting support 36'. This can be achieved by careful attention to circumferential segmentation of the generating conductors 40' and connection means 18'/42'. It will also be understood that it is important for there to be sufficient circumferential continuity, or overlap, among neighboring conductors 40' and connecting means 18'/42' so that as individual generating conductors 40' connect to and disconnect from individual connecting means 18'/42' due to rotation of the shaft 16', there will always be a continuous circuit in output 12', through at least some of the generating conductors 40'.

FIG. 5 shows a schematic representation of one possible embodiment of generating conductors 40' arranged circumferentially on a non-conductive support 36' in such a way to provide overlap between connection means 18', also spaced circumferentially, and individual generating conductors 40', even as the generating conductors 40' move due to rotation of shaft 16'. This arrangement provides interconnection, while minimizing eddy current losses. This interconnection arrangement can be continued in a series around the entire circumference of the support 36'. In this example, interconnection means 42' (together with connection means 18') creates a series circuit of individual generating conductors 40' through output 12' and load 20' while preventing the creation of a low-resistance conductive path in which eddy currents could flow to enclose the magnetic flux in the air-gap section 6'—of magnetic pathway 4'. The voltage in output 12' will be the series sum of the voltages induced in individual generating conductors 40' in the series.

It will be noted that in this arrangement individual generating conductors 40' are disconnected and then reconnected to the output 12' by means of connections means 18' and interconnection means 42'. Because of the aforementioned overlap and continuity through output 12, there is no inductive effect of the output 12' complicating the disconnect procedure as would be the case in typical commutation arrangements. In this arrangement there is only a negligible inductive effect from each individual generating conductor 40' as it is disconnected in this process. Thus the usual problems of commutation are avoided, achieving an objective of this invention.

Because only a single-phase output 12 is needed, there is no requirement for rectification or other electronic processing of the output to combine multiple phases, thus avoiding the need for additional components and achieving one of the objects of this invention. In turn, this eliminates any rectification losses, ripple, or need for filtering, achieving other of the stated objects of this invention. Additionally, the absence of rectifiers, etc. allows an unimpeded path for currents to flow back into the generator stages 2 during any portion of the AC cycle which allows the device to handle arbitrary combinations of resistive and reactive loads without any special adaptations, thus achieving another object of the invention. The single-phase output eliminates the need for rapid switching of output current from one phase to another, as would be needed with poly-phase high-frequency alternators. This lowers the attenuation effect of the inductance of the output phase, achieving yet another object of this invention. Also, the single-phase output eliminates the existing restriction on increasing the power frequency modulation to about 400 Hz or more, thus allowing variable shaft speeds in generators for avionic power systems, achieving another objective of this invention.

Although the invention has been described with respect to various embodiments, it should be realized this invention is also capable of a wide variety of further and other embodiments within the spirit and scope of the appended claims.

What is claimed is:

1. An apparatus for generating power frequency alternating current and voltage output from the rotation of a shaft, wherein power generation is generally independent of the speed of the shaft, the apparatus comprising a single-pole type generator stage coupled to a resonant circuit and couplable to the shaft, wherein the single-pole generator stage generates an output upon rotation of the shaft, the output, including a sinusoidal output voltage and an alternating output current, is excited by electrical currents in said resonant circuit, and wherein the resonant circuit itself is excited at the power frequency by use of resonant circuit techniques under supervision of a controller to generate the sinusoidal output voltage and alternating output current without rectification, commutation, or electronic processing of the output, wherein said single-pole type generator stage includes:

(a) a low loss magnetic pathway at least part of which is an air-gap section and the balance of which includes a low loss magnetic core;

(b) a field coil means for exciting a magnetic field and magnetic flux within said magnetic pathway;

(c) a plurality of generating conductor segments on a support and arranged by interconnecting means as a single-phase output, wherein at least part of said generating conductor segments are located within said air-gap portion of said magnetic pathway, and wherein said generating conductor segments are arranged to minimize eddy current losses;

(d) means to connect said single-phase output winding to an external load; and (e) a shaft rotatably connected to said support and arranged to rotate in response to the input of mechanical power and arranged with means to provide relative motion between said generating conductors of said single-phase output and said magnetic field in said air gap of said magnetic pathway, said magnetic field induced by electrical currents in said field coil means, thereby generating voltage and current output in said single-phase output, and wherein the intensity, polarity and direction of said magnetic field, as seen by generating conductors in said air gap, is not changed by said relative motion, and wherein said interconnecting means are arranged so that they are not exposed to said relative motion between said magnetic field and said generating conductors.

2. The apparatus as claimed in claim 1, wherein said low loss magnetic core is of high magnetic permeability.

3. The apparatus as claimed in claim 1, wherein said field coil means for exciting said magnetic field and magnetic flux within said magnetic pathway is achieved by means of electrical current within said field coil means.

4. The apparatus as claimed in claim 1, wherein said field coil means forms part of the resonant circuit, which resonant circuit further includes:

(i) an inductance of said field coil means;

(ii) a capacitor element selected or provided with means to tune said resonant circuit to said power frequency;

(iii) a driver circuit to excite resonant behavior of said resonant circuit; and (iv) an equivalent resistance equal to a parasitic resistance of said field coil means plus a loss resistance from eddy currents and magnetic-path losses, wherein said equivalent resistance is designed to minimize the energy lost in the parasitic resistance during each cycle of excitation when compared to the peak energy stored in the inductor during each cycle.

5. The apparatus as claimed in claim 4, wherein said driver circuit is designed to excite sinusoidal resonant electrical currents in said field coil means and to minimize its own internal losses.

6. The apparatus as claimed in claim 5, further comprising a feedback control circuit that controls the excitation of said field coil means so that said output will match the phase and amplitude of a reference signal that is either internal or external thereto.

7. The apparatus as claimed in claim 6 wherein said feedback control circuit further controls connection of said output to an external load or grid when the phase or amplitude is within specified tolerances.

8. The apparatus as claimed in claim 6, wherein said driver circuit includes a pulse-width-modulation circuit including an H-Bridge connecting said resonant circuit incorporating said field coil means to a low-voltage unipolar DC power supply.

9. The apparatus as claimed in claim 4, wherein said means to tune said resonant circuit includes means for controlling the duty cycle of a portion of said capacitive element such that the effective capacitance of said capacitive element is modified in a way to tune said resonant circuit to said desired power frequency.

10. The apparatus as claimed in claim 2, wherein said low loss magnetic core is fabricated of a material is selected from the group consisting of laminated magnetic steel, laminated electrical steel, and high permeability ferro composite materials.

11. The apparatus as claimed in claim 1, further comprising a second support with a plurality of generating conductor segments thereon and rotatably connected to said shaft, and wherein said plurality of generating conductor segments are connected to said interconnecting means for said single-phase output.

12. The apparatus as claimed in claim 1, further comprising a plurality of said single-pole type generator stages.

13. The apparatus as claimed in claim 1, wherein said low loss magnetic pathway includes means to prevent low-resistance circumferentially-conductive pathways within portions of said generator that encircle time-varying magnetic flux of said magnetic field.

14. The apparatus as claimed in claim 1, wherein said low loss magnetic pathway includes means to prevent eddy currents flowing in pathways enclosing said magnetic pathway.

15. The apparatus as claimed in claim 1, wherein said generating conductors and said interconnection means are arranged to prevent eddy currents from flowing in pathways enclosing said magnetic pathway, except by means of said single phase output through an external load.

16. The apparatus as claimed in claim 15, wherein a plurality of individual ones of said generating conductors are arranged radially on a non-conductive support, which moves with rotation of said shaft, and wherein said interconnection means are spaced circumferentially to provide an overlap of interconnections such that, at every instant of rotation of said shaft, there is a series circuit through said single phase output through an external load, without the creation of a low resistance electrical path for eddy currents to flow and enclose said magnetic pathway.

17. The apparatus as claimed in claim 15, wherein a plurality of individual ones of said generating conductors are arranged circumferentially on a non-conduction support, which moves with rotation of said shaft, and wherein said interconnection means are spaced circumferentially to provide an overlap of interconnections such that, at every instant of rotation of said shaft, there is a series circuit through said single phase output through an external load, without the creation of a low resistance electrical path for eddy currents to flow and enclose said magnetic pathway.

18. An apparatus for generating power frequency alternating current and voltage output from the rotation of a shaft, wherein power generation is generally independent of the speed of the shaft, the apparatus comprising a single-pole type generator stage coupled to a resonant circuit and couplable to the shaft, wherein the single-pole generator stage generates an output upon rotation of the shaft, the output, including a sinusoidal output voltage and an alternating output current, is excited by electrical currents in said resonant circuit, and wherein the resonant circuit itself is excited at the power frequency by use of resonant circuit techniques under supervision of a controller to generate the sinusoidal output voltage and alternating output current without electronic processing of the output to combine multiple phases, wherein the single-pole type generator stage includes:

(a) a low loss magnetic pathway at least part of which is an air-gap section and the balance of which includes a low loss magnetic core;

(b) a field coil forming a portion of the resonant circuit for exciting a magnetic field and magnetic flux within said magnetic pathway;

(c) a plurality of generating conductor segments on a support and arranged by interconnecting means as a single-phase output, wherein at least part of said generating conductor segments are located within said air-gap portion of said magnetic pathway, and wherein said generating conductor segments are arranged to minimize eddy current losses;

(d) means to connect said single-phase output winding to an external load; and (e) a shaft rotatably connected to said support and arranged to rotate in response to the input of mechanical power and arranged with means to provide relative motion between said generating conductors of said single-phase output and said magnetic field in said air gap of said magnetic pathway, said magnetic field induced by electrical currents in said field coil, thereby generating voltage and current output in said single-phase output, and wherein the intensity, polarity and direction of said magnetic field, as seen by generating conductors in said air gap, is not changed by said relative motion, and wherein said interconnecting means are arranged so that they are not exposed to said relative motion between said magnetic field and said generating conductors.

* * * * *